Sept. 28, 1926.                     1,601,305
N. HANSEN
RESILIENT DRIVE WHEEL
Filed May 12, 1919
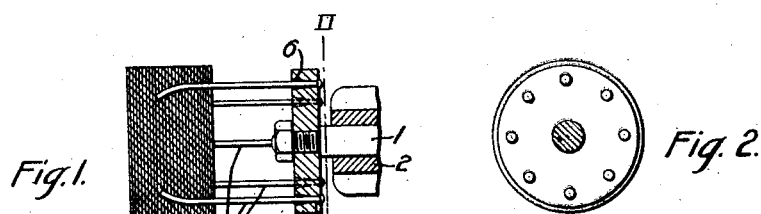
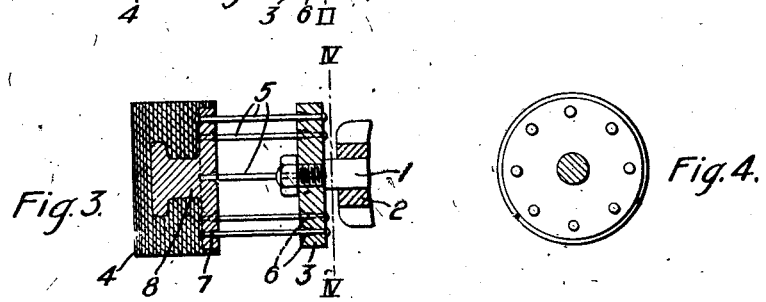
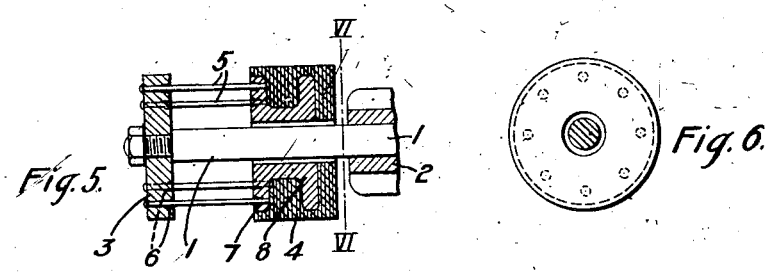
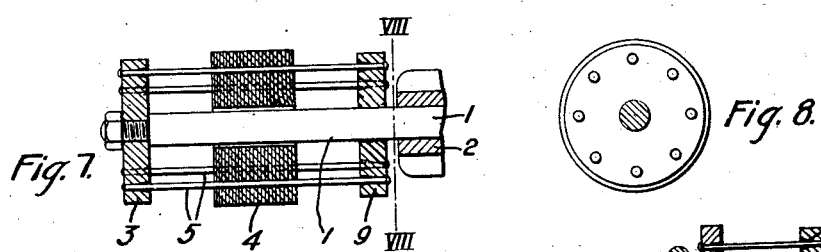
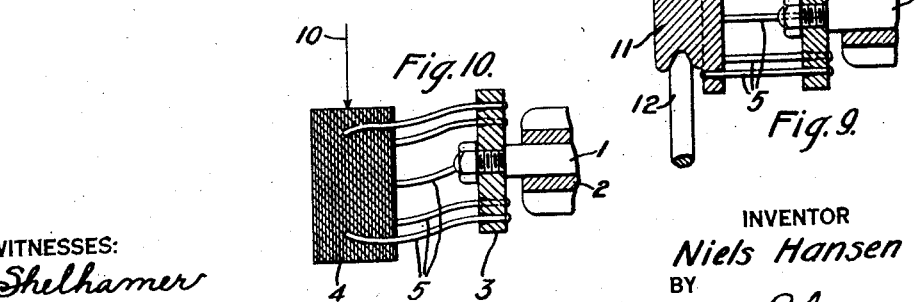
WITNESSES:
H. J. Shelhamer
F. A. Lind.
INVENTOR
Niels Hansen
BY
Wesley G. Carr
ATTORNEY Patented Sept. 28, 1926.

1,601,305

UNITED STATES PATENT OFFICE.

NIELS HANSEN, OF WILKINSBURG, PENNSYLVANIA, ASSIGNOR TO WESTINGHOUSE ELECTRIC & MANUFACTURING COMPANY, A CORPORATION OF PENNSYLVANIA.

RESILIENT DRIVE WHEEL.

Application filed May 12, 1919. Serial No. 296,466.

My invention relates to resilient drive wheels for friction-drive, power-operated devices, and it has for its object to provide a novel device of the character designated that shall be simple and inexpensive to manufacture and strong and durable in construction.

In the accompanying drawing, Fig. 1 is a sectional view showing a drive wheel mounted upon a shaft in accordance with my invention; Fig. 2 is a view, partially in section and partially in elevation, taken along the line II—II of Fig. 1. Figs. 3, 5, 7 and 9 are views, similar to Fig. 1, of modifications of my invention, and Figs. 4, 6 and 8 are views, similar to Fig. 2, taken along the lines IV—IV, VI—VI and VIII—VIII of Figs. 3, 5 and 7, respectively. Fig. 10 is a view, similar to Fig. 1, showing an exaggerated displacement of the drive wheel caused by a side thrust.

Heretofore, it has been customary, in devices employing friction drives, with power provided by small individual motors, as, for example, in sewing machines, to construct the drive wheel in such a manner that the entire motor must be resiliently mounted in order to maintain engagement between the drive wheel and the member which it engages.

By my invention, I provide a device wherein the motor may be rigidly mounted and the drive wheel held in resilient engagement with its associated driven member by means of a novel resilient device by which the drive wheel is mounted upon the shaft. This device holds the drive wheel in engagement with the driven wheel, even though there be irregularities in the engaging surface of either of these members. Briefly speaking, the device whereby the drive wheel is mounted on the shaft consists of a collar member rigidly mounted thereon and a plurality of longitudinally disposed resilient members each having one end attached to this collar member and its other end attached to the drive wheel.

For a further understanding of my invention, reference may now be had to the drawings in which I show a shaft 1 mounted within a bearing 2 and provided with a collar member 3 rigidly mounted thereon.

A drive wheel 4 is attached to the collar member 3 by means of a plurality of resilient members 5 such, for example, as pieces of piano wire, which are soldered, or otherwise rigidly attached, within openings 6 in the power member 3 and which are molded into the drive wheel 4.

In the modification shown in Figs. 3 and 4, the wires 5 are soldered in the collar member 3 at 6 and into openings 7 in a metallic reinforcing member 8 disposed within the molded drive wheel 4.

In the modification shown in Figs. 5 and 6, the drive wheel 4 is so mounted as to surround the shaft 1 but is spaced therefrom. The advantage of such structure is that when an abnormal side thrust is exerted upon the drive wheel, it will be supported by the shaft 1, thereby preventing it from being injured.

In the modification shown in Figs. 7 and 8, the drive wheel 4 is so mounted as to surround the shaft 1 but is spaced therefrom in a manner similar to that shown in Fig. 5 and is supported from a rigidly mounted collar member 3 mounted on the end of the shaft and a slidable collar member 9 also mounted on the shaft 1. In this structure, the wires 5 extend between the collar members 3 and 9, and the drive wheel 4 is mounted on the central portions thereof. This structure provides a more rigid support for the wheel 4 and, at the same time, possesses the advantage of having the shaft 1 support the drive wheel 4 against any side thrust.

Fig. 9 illustrates a modification of my invention adapted for use on belt-driven machines such, for example, as a belt-driven sewing machine, a metallic pulley 11 being mounted on the wires 5, in a manner similar to that already described and is grooved to receive a belt 12.

When a side thrust is exerted upon the drive wheel 4, the resilient members 5 will cause it to move in the direction of the thrust, as indicated by the arrow 10 in Fig. 10, the wires being of exactly the same length and maintaining the drive wheel in parallel relation with the shaft.

It will be obvious that, with a structure constructed in accordance with my invention, the drive wheel 4 may be moved in any direction perpendicular to the shaft 1 but will always be maintained in parallel relationship therewith. The openings 6 in the members 3 are of slightly greater diameter at the side of the member 3 adjacent the drive wheel than at the other side in order that there shall be no sharp bends in the wires at their points of attachment to the member 3.

Although I have shown my invention in a plurality of forms, it will be obvious to those skilled in the art that it is susceptible of additional changes and modifications without departing from the spirit thereof and I desire, therefore, that only such limitations shall be placed thereupon as are imposed by the prior art or are specifically set forth in the appended claims.

I claim as my invention:

1. A power-transmission device comprising a shaft and a spaced concentrically disposed drive wheel, and means for mounting said drive wheel on said shaft comprising a plurality of longitudinally extending universally resilient members each having one end attached to said shaft and having its other end attached to said drive wheel.

2. A power-transmission device comprising a shaft and a spaced concentrically disposed molded drive wheel, said shaft being provided with a collar member, and said drive wheel being mounted thereon by means of longitudinally disposed resilient wires one end of each of which is fastened to said collar member and the other end of which is molded into said drive wheel.

3. A power-transmission device comprising a shaft and an axially spaced concentrically disposed drive wheel, said shaft being provided with a collar member, and wires of relatively small diameter disposed longitudinally between said drive wheel and said collar member attached thereto, whereby said drive wheel may effect resilient frictional engagement with elements to be operated thereby.

In testimony whereof, I have hereunto subscribed my name this 30th day of April, 1919.

NIELS HANSEN.